(12) United States Patent
Wang

(10) Patent No.: US 11,086,413 B2
(45) Date of Patent: *Aug. 10, 2021

(54) CONTEXT-DEPENDENT WHEELS AND BUTTONS

(71) Applicant: Yong Wang, Fremont, CA (US)

(72) Inventor: Yong Wang, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,422

(22) Filed: Feb. 26, 2019

(65) Prior Publication Data

US 2020/0272251 A1   Aug. 27, 2020

(51) Int. Cl.
| G06F 3/048 | (2013.01) |
| G06F 3/0354 | (2013.01) |
| G06F 3/0362 | (2013.01) |
| G06F 3/0485 | (2013.01) |
| G06F 3/0482 | (2013.01) |
| G06F 3/0484 | (2013.01) |
| G06F 3/0487 | (2013.01) |

(52) U.S. Cl.
CPC ........ *G06F 3/03543* (2013.01); *G06F 3/0362* (2013.01); *G06F 3/0482* (2013.01); *G06F 3/0485* (2013.01); *G06F 3/0487* (2013.01); *G06F 3/04847* (2013.01)

(58) Field of Classification Search
None
See application file for complete search history.

(56) References Cited

U.S. PATENT DOCUMENTS

| 5,581,670 | A | * | 12/1996 | Bier | G06F 3/0481 345/629 |
| 5,666,499 | A | * | 9/1997 | Baudel | G06F 3/0481 345/157 |
| 5,689,667 | A | * | 11/1997 | Kurtenbach | G06F 3/0482 715/810 |
| 7,358,956 | B2 | * | 4/2008 | Hinckley | A63F 13/06 345/156 |
| 9,207,806 | B2 | * | 12/2015 | Burtner | G06F 3/0416 |
| 9,367,151 | B2 | * | 6/2016 | McKillop | G06F 3/041 |
| 9,417,716 | B2 | * | 8/2016 | Ludwig | G06F 3/0414 |
| 9,792,040 | B2 | * | 10/2017 | Fitzmaurice | G06F 3/04842 |
| 2009/0079693 | A1 | * | 3/2009 | Monney | G06F 3/0312 345/157 |
| 2009/0079711 | A1 | * | 3/2009 | Monney | G06F 3/03543 345/184 |
| 2016/0259433 | A1 | * | 9/2016 | Stephenson | G06F 3/03543 |

* cited by examiner

Primary Examiner — Sunit Pandya

(57) ABSTRACT

A computer system comprises a input device with a scroll wheel and a plurality of control buttons, a display device and a computer input device application program executable on the computer processor configured to manage a multi-level context-dependent cascading menu interface wherein each menu item includes a plurality of wheel-control functions and a plurality of click-commands; specify a plurality of menu operations, a plurality of control-wheel operations and a plurality of command-click operations from the various actions on the input device; move the highlight in the menu structure based on the menu operations; update and display the contents of the highlighted menu item under the active menu layer; change the value of the specified wheel-control function listed for the highlighted menu item when detected a control-wheel operation; trigger the specified click-command listed for the highlighted menu item when detected a command-click operation.

17 Claims, 12 Drawing Sheets

Table 1: Operation assignment for a mouse with one menu-button and three control-buttons

| Operation Name | Operation Assignment | Operation Function |
|---|---|---|
| Menu-down operation | Click left button while clicking and holding menu-button m | Move the hightlight down to the submenu layer |
| Menu-up operation | Click right button while clicking and holding menu-button m | Move the highlight up to the parent menu item |
| Menu-on/off operation | Click menu-button m | Toggle menu_Display value |
| Menu-wheel operation | Rotate wheel while clicking and holding menu-button m | Scroll the highlight in the active menu layer |
| $1^{st}$ control-wheel operation | Rotate wheel while clicking and holding control-button C1 | Change the $1^{st}$ wheel-control function value |
| $2^{nd}$ control-wheel operation | Rotate wheel while clicking and holding control-button C2 | Change the $2^{nd}$ wheel-control function value |
| $3^{rd}$ control-wheel operation | Rotate wheel while clicking and holding control-button C3 | Change the $3^{rd}$ wheel-control function value |
| $1^{st}$ & $2^{nd}$ command-click operation | Click left/right button while clicking and holding control-button C1 | Trigger the $1^{st}$ & $2^{nd}$ click-command |
| $3^{rd}$ & $4^{th}$ command-click operation | Click left/right button while clicking and holding control-button C2 | Trigger the $3^{rd}$ & $4^{th}$ click-command |
| $5^{th}$ & $6^{th}$ command-click operation | Click left/right button while clicking and holding control-button C3 | Trigger the $5^{th}$ & $6^{th}$ click-command |
| Backward | Click control-button C1 | Trigger "Backward page" command |
| Forward | Click control-button C2 | Trigger "Forward page" command |
| Undo | Click control-button C3 | Trigger "Undo" command |

FIG. 3

Table 2: Operation assignment with expanded wheel operations and click operations for a mouse

| Operation Name | Operation Assignment | Operation Function |
|---|---|---|
| 4th control-wheel operation | Rotate wheel while double clicking and holding control-button C1 | Change the 4th wheel-control function value |
| 5th control-wheel operation | Rotate wheel while double clicking and holding control-button C2 | Change the 5th wheel-control function value |
| 6th control-wheel operation | Rotate wheel while double clicking and holding control-button C3 | Change the 6th wheel-control function value |
| 7th & 8th command-click operations | Click left/right button while double clicking and holding control-button C1 | Trigger the 7th & 8th click-command |
| 9th & 10th command-click operations | Click left/right button while double clicking and holding control-button C2 | Trigger the 9th & 10th click-command |
| 11th & 12th command-click operations | Click left/right button while double clicking and holding control-button C3 | Trigger the 11th & 12th click-command |

FIG. 4

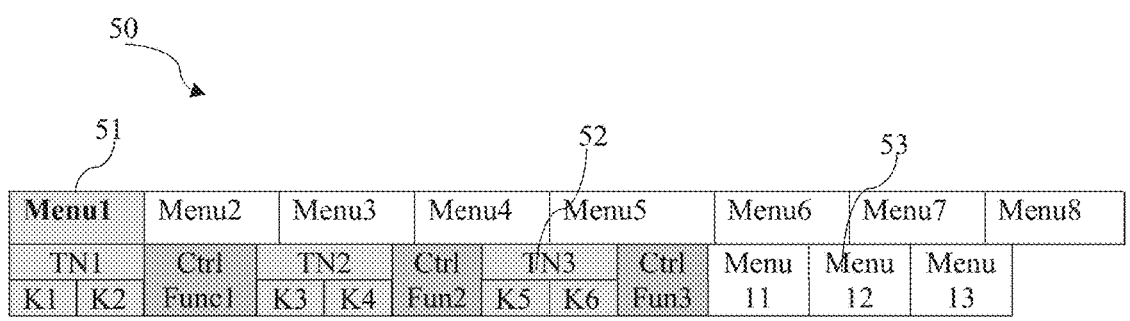

FIG. 5A

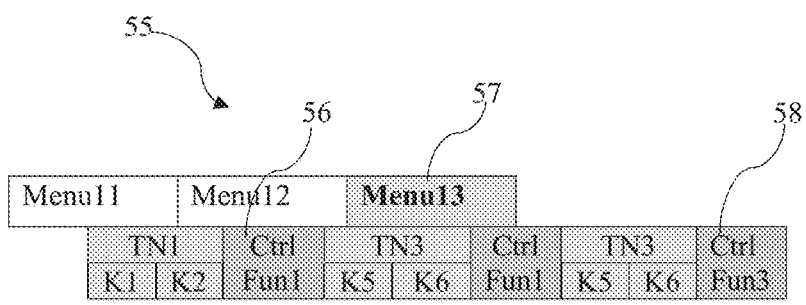

FIG. 5B

Table 3: The Operation Assignment for the Context-Dependent Wheels and Buttons on the Computer Keyboard

| Operation Name | Operation Assignment | Operation Function |
|---|---|---|
| default wheel operation | Scroll wheel in the original mode | Vertical scrolling the display |
| Mode Switch operation (menu-on/off operation) | Long pree mode button CD | Toggle the mode of dual-mode keys between original mode and context-dependent mode |
| Menu-on/off operation | Long pree mode button CD | Toggle the menu_Display between on and off |
| Menu-wheel-set operation | Click the mode button CD | Set the wheel as menu-wheel |
| Menu-wheel operation | Rotate wheel after click mode button CD | Scroll the highlight in the same menu layer |
| Menu-down operation | Click key W in context-dependent mode | Move the hightlight down to the first submenu item |
| Menu-up operation | Click key Q in context-dependent mode | Move the highlight to the parent menu item |
| Menu-right operation | Click key R in context-dependent mode | Move the highlight to the adjacent menu item on the right |
| Menu-left operation | Click key E in context-dependent mode | Move the highlight to the adjacent menu item on the left |
| Control-wheel-set operation | Click the functional key Fn in context-dependent mode | Set the wheel as the n-th control-wheel. |
| Control-wheel operation with index n | Rotate wheel after click functional key Fn | Change the value of n-th wheel control function |
| Command-click operation with index i | Click digital key i in context-dependent mode | Trigger the i-th click command |

FIG. 7

| Menu 1 | Menu 2 | Menu 3 | Menu 4 | Menu 5 | Menu 6 | | | | | | |
|---|---|---|---|---|---|---|---|---|---|---|---|
| Ctrl F1 | Ctrl F2 | Ctrl F3 | Ctrl F4 | Ctrl F5 | Ctrl F6 | Ctrl F7 | Ctrl F8 | Ctrl F9 | Ctrl F10 | Menu 21 | Menu 22 |
| Cmd 1 | Cmd 2 | Cmd 3 | Cmd 4 | Cmd 5 | Cmd 6 | Cmd 7 | Cmd 8 | Cmd 9 | Cmd 0 | | |

FIG. 8A

| Menu21 | Menu 22 | | | | | | | | | | |
|---|---|---|---|---|---|---|---|---|---|---|---|
| Ctrl F1 | Ctrl F2 | Ctrl F3 | Ctrl F4 | Ctrl F5 | Ctrl F6 | Ctrl F7 | Ctrl F8 | Ctrl F9 | Ctrl F10 | Ctrl F11 | Ctrl F12 |
| Cmd 1 | Cmd 2 | Cmd 3 | Cmd 4 | Cmd 5 | Cmd 6 | Cmd 7 | Cmd 8 | Cmd 9 | Cmd 0 | | |

FIG. 8B

| System | Tone/ Presence | Tone Curve | White Balance /Color | Sharpening/ Noise Reduction | Camera Calibration |
|---|---|---|---|---|---|
| Vertical Scroll | Horizontal Scroll | F3: Zoom 110% | Rotate +90 | F5: Volume 85 | F6: Brightness 92 |
| Backward | Forward | 3: Undo | Redo | 5: Mute | Stop | Play/Pause | 8: Open "One Note" |

FIG. 9A

| System | Tone/ Presence | Tone Curve | White Balance /Color | Sharpening/ Noise Reduction | Camera Calibration |
|---|---|---|---|---|---|
| F1: WB | | All Color | F5: Red | F7: Orange | F9: Yellow | Gr/Ag/Bl /Pu/Ma |
| Temp | Tint | Sat | Lum | Sat | Lum | Sat | Lum | Sat | Lum | |
| Undo | Redo | 3,4: Hue+/- | 5: Hue+/- | 7: Hue+/- | 9: Hue+/- | |

FIG. 9B

| Gr/Ag/Bl/Pu/Ma | | | | | | | | | |
|---|---|---|---|---|---|---|---|---|---|
| F1: Green | | F3: Aqua | | F5: Blue | | F7: Purple | | F9: Magenta | |
| Sat | Lum | Sat | Lum | Sat | Lum | Sat | Lum | Sat | Lum |
| 1: Hue+/- | | 3: Hue+/- | | 5: Hue+/- | | 7: Hue+/- | | 9: Hue+/- | |

FIG. 9C

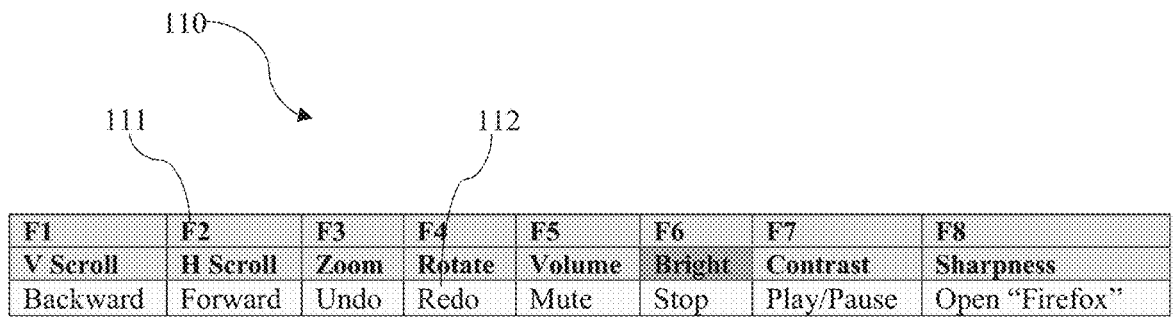

FIG. 10

Table 4    Applications that the context-dependent wheels and buttons can supports

| Index | Application Category | Application Tools |
|---|---|---|
| 1 | Office Document Editing | MS Word<br>MS OneNote<br>MS Excel<br>MS PowerPoint<br>MS Visio |
| 1 | Photo Editing | Adobe Photoshop<br>Adobe Lightroom<br>Apple Photos (for macOS)<br>Corel PaintShop Pro<br>CorelDRAW |
| 2 | Video Editing | Adobe Premiere Pro<br>Apple Final Cut Pro X<br>Corel VideoStudio Ultimate<br>Sony Catalyst Production Suite |
| 3 | Audio Editing | Adobe Audition<br>Apple Logic Pro X |
| 4 | CAD Design | AutoCAD<br>TurboCAD |

FIG. 11

CONTEXT-DEPENDENT WHEELS AND BUTTONS

BACKGROUND OF THE INVENTION

1. Field of the Invention

The present invention relates to the field of computer systems, more particularly, the present invention relates to computer context-dependent wheels and buttons on the computer mouse or keyboard which support the multi-level context-dependent cascading menu interface and provide the methods to change the value of multiple wheel-control functions and trigger multiple click-commands in a single selected menu item.

2. Description of the Related Art

The context-dependent menu interface is immediacy and convenience to the most computer application usage. The menu selection and the control value adjusting are done by a dial based computer input device. With the help of the context-dependent menu displayed on the screen, the operation is comfortable and very user friendly.

Two good examples are the Microsoft Surface Dial Device and Logitech Crown Dial on the Craft keyboard.

Surface Dial is a standalone input device connected with windows with Bluetooth connection. Microsoft has had most of its windows apps to work with Surface Dial. Press and hold Surface Dial triggers displaying a radial menu which is the context-dependent with the active windows application. This makes the function menu selection easier and without touching the keyboard and mouse. Rotating the dial can select the target menu. Clicking the dial to confirm the selection. After that the control value of the selected menu is changed when rotating the dial—increasing the value for clockwise rotation and decreasing the value for anticlockwise rotation.

Craft Crown Dial is a touch-sensitive input dial on the Logitech keyboard Craft—a flagship keyboard of Logitech. With a slight touch of the Crown Dial, user can instantly access context-specific functions. Each slight touch of the Crown Dial, the active menu item moves to the next with one direction cycle scheduling. With the Logitech Options Software, Crown Dial can maximize the creative process when working with Adobe Photoshop editing, Adobe Premier Pro video editing and Microsoft Office tools. Crown Dial brings comfort, immediacy and convenience to the usage.

Through careful analysis of the above two applications, it can be found that each of them has certain drawbacks—only one tap operation and one dial operation could be used for the menu interface, it makes manipulation of the context-dependent menu less convenient and less efficiency.

For Surface Dial, when a menu is selected after rotating the dial, a tap operation is needed to convert the dial to the control mode. When finishing adjusting a wheel-control function in a submenu, it is needed to tap dial to change from control mode to menu mode and then rotate the dial to specific position which is back to up menu level, then tap dial again to back to parent menu level. Finally, each menu item has only one wheel-control function. If users want to zoom and rotate a target on the display, many menu operations are required when swap these two functions.

For Crown Dial, light touch the dial is dedicated to one-directional moving highlight one-by-one and rotating the dial is dedicated to changing the wheel-control function value. It cannot handle the multi-level context-dependent menu interface. This limits the flexibility of the device. Also, if the menu item to be used is on the left side of the highlight, it needs many light touch operations to move the highlight, the highlight can only be moved in one direction cycle scheduling. It can cause users to feel uncomfortable as the number of menu items increases.

SUMMARY OF THE INVENTION

The present invention provides a system and method of implementing the context-dependent wheels and buttons on the computer mouse or keyboard. A plurality of menu operations and control operations are specified by the computer input device application program from the various operations on the scroll wheel, buttons on the mouse or keys on the keyboard. The menu operations include: A menu-wheel operation, a menu-on/off operation, a menu-down operation and a menu-up operation. The control operations include: a plurality of control-wheels operations and a plurality of command-click operations.

The computer input device application program manages a multi-level context-dependent cascading menu interface for the active application wherein each menu item includes a plurality of wheel-control functions, a plurality of click-commands and a plurality of submenu items. It displays two-layer menu on the display device. The active menu layer with one highlighted menu item is displayed on top and the content of the highlighted menu item is displayed under the active menu layer. The highlight is moved in the menu structure by the menu operations, the computer input device application program calls the active application interface function to change the value of the specified wheel-control function which is listed for the highlighted menu item when it detects a respective control-wheel operation; It executes the specified click-command which is listed for the highlighted menu item when it detects a command-click operation.

In one embodiment of the present invention, a computer mouse has one menu-button and three control-buttons on the thumb side wall of the mouse. The computer mouse device application program assigns four menu operations from the joint operation involving the menu-button: the menu-on/off operation is specified as clicking the menu-button. The menu-down operation is specified as clicking left button while clicking and holding the menu-button. The menu-up operation is specified as clicking right button while clicking and holding the menu-button. The menu-wheel operation is specified as rotating the scroll wheel while clicking and holding the menu-button, three control-wheel operations are assigned and each control-wheel operation is specified as rotating the scroll wheel while clicking and holding a control-button. 6 command-click operations are assigned and each command-click operation is specified as clicking the left (or right) button while clicking and holding a control-button. With supported by the computer mouse device application program, the menu-down operation moves the highlight to the first submenu item. The menu-up operation moves the highlight back to the parent menu item. The menu-wheel operation scrolls the highlight in the active menu layer in both directions. Each menu item can include up to three wheel-control functions and up to six click-commands. After selecting a menu item, the control-wheel operation with index n changes the value of the n-th wheel-control function listed for the highlighted menu item. The command-click operation with index m triggers execution of the m-th click-command listed for the highlighted menu item.

In another embodiment of the present invention, a computer keyboard has one scroll wheel and one mode button in its top area. A mode switch operation is specified as long pressing the mode button CD and used to toggle the keyboard mode between the original mode and the context-dependent mode. The default mode is the original mode. For the context-dependent mode, the computer keyboard device application program assigns five menu operations: the menu-down operation is specified as clicking key W; the menu-up operation is specified as clicking key Q; the menu-left operation is specified as clicking key E; the menu-right operation is specified as clicking key R; the menu-wheel operation is specified as rotating the wheel after clicking the mode button CD. The computer keyboard device application program also assigns a plurality of control-drag operations and a plurality of command-tap operations: the control-drag operation with index n is specified as rotating the wheel after clicking the functional key Fn; the command-click operation with index k is specified as clicking the digital key k. During the context-dependent mode the context-dependent menu interface is displayed and all the operations specified for context-dependent are active. The menu-down operation moves the highlight to the first sub-menu item.

The menu-up operation moves the highlight back to the parent menu item. The menu-left operation moves the highlight to the adjacent menu item on the left one by one in the active menu layer. The menu-right operation moves the highlight to the adjacent menu item on the right one by one in the active menu layer. The menu-wheel operation scrolls the highlight in the active menu layer in both directions. Each menu item can include up to 12 wheel-control functions, up to 10 click-commands and plurality of submenu items. After selecting a menu item, the control-wheel operation with index n changes the value of the n-th wheel-control function listed for the highlighted menu item. The command-click operation with index m triggers execution of the m-th click-command listed for the highlighted menu item. Any switching between the control operations does not need any menu operation involved. During the original mode, all the operations specified for the context-dependent mode are inactive, scrolling the wheel is preconfigured as a system function such as scrolling the display in vertical direction.

The present invention provides a system and method for the computer context-dependent menu interface wherein multiple menu operation are specified for easy and fast manipulating the menu selection. For any selected menu item, multiple wheel-control function for the continuous variable and multiple click-commands can be executed without any menu switching operation. The wheel-control function for the continuous variable enables users to evaluate all the effects during the continuously back and forth scrolling wheel.

With the help of the context-dependent menu displayed on the screen, the multiple control-wheel operations and multiple command-click operations for a single selected menu item work as a multi-functional control panel. A plurality of control buttons and a plurality of control dials or control sliders are disposed on the control panel.

Because the context-dependent wheels and buttons are implemented on the computer mouse and keyboard, they form a powerful seamless tool function combining which supports users to finish their various jobs with easier operation and productive process.

BRIEF DESCRIPTION OF THE DRAWINGS

FIG. 3 is an operation assignment table for a computer mouse with one menu-button and three control-buttons, FIG. 4 shows the expended operation assignment for the control-wheel-operation and command-click operation.

FIG. 5A is the general menu format of the context-dependent menu interface for the mouse scroll wheel.

FIG. 5B is the bottom menu format for the mouse scroll wheel.

FIG. 7 is an operation assignment table for the context-dependent wheels and buttons on the computer keyboard.

FIG. 8A is the general menu format of the context-dependent menu interface for the wheel on the keyboard.

FIG. 8B is the bottom menu format for the wheel on the keyboard.

FIG. 9A is an example of the context-dependent menu user interface for a photo editing software using keyboard.

FIG. 9B is the top menu structure when the highlight is in the top menu item "White Balance/Color".

FIG. 9C is the bottom menu structure of the menu item "Gr/Ag/Bl/Pu/Ma".

FIG. 10 is an example of the command-function only list that the control-wheel-operations and command-click operations support without menu selection.

FIG. 11 shows the applications that the system and methods of present invention can support.

DETAILED DESCRIPTION OF THE INVENTION

Some embodiments of the present invention will be described below. In an effort to provide a concise description of these embodiments, not all features of an actual implementation are described in the specification.

Figure 1:
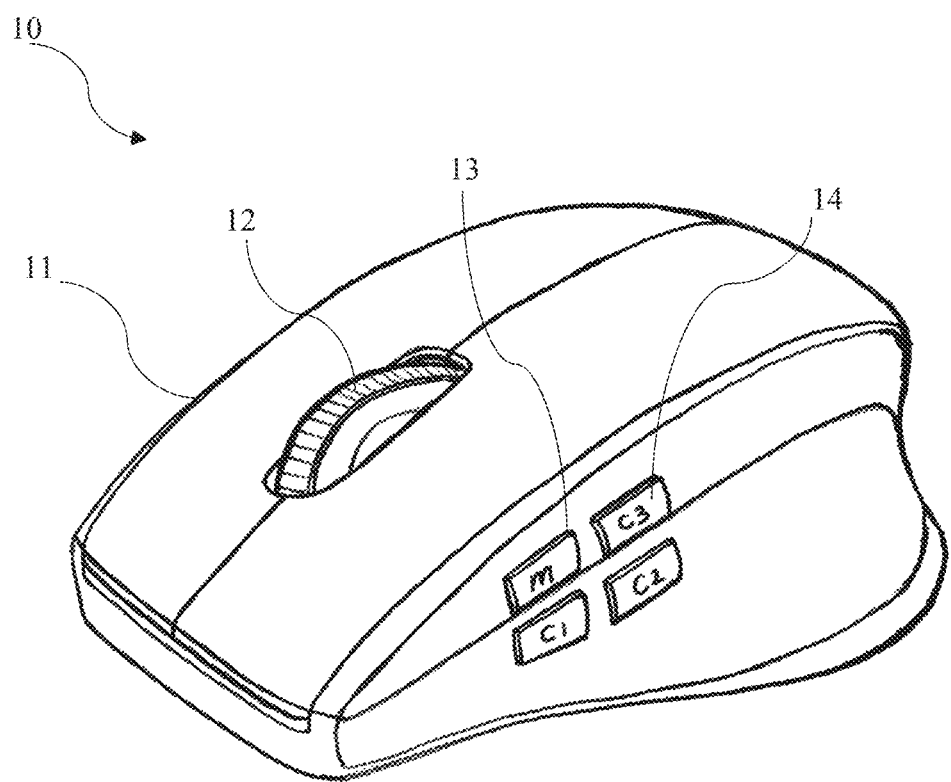
FIG. 1 is a perspective view of a computer mouse with a menu-button (m) and three control-buttons (C1, C2 and C3).

Referring to FIG. 1, a computer mouse 10 includes one menu-button m and three control-buttons (C1, C2 and C3) disposed on the thumb side wall. A plurality of menu operations and the control operations are specified from the joint operations involving the menu-button and control-buttons. The menu operation and control operations are used for manipulating the context-dependent menu interface. Table 1 shown in FIG. 3 gives an embodiment of the operation assignments.

All context-dependent mode related operations are those related the menu-button and the control-buttons. They can be easily distinguished from the ordinary mouse scrolling and button clicking functions. So, the ordinary scrolling and clicking functions can be maintained.

Three menu-click operations and one menu-wheel operation are specified as the combination operations involving the menu-button. The menu on/off operation is specified as clicking the menu-button m; the menu-down operation is specified as clicking the left button of the mouse while clicking and holding the menu-button m; the menu-up operation is specified as clicking the right button of the mouse while clicking and holding the menu-button m; the menu-wheel operation is specified as rotating the wheel while clicking and holding the menu-button m.

Three control-wheel operations and six command-click operations are specified as the combination operations involving three control-buttons: for example, the first control-wheel operation is specified as rotating the wheel while clicking and holding the control-button C1; the first two command-click operations are specified as clicking the left button and right button of the mouse respectively while clicking and holding the control-button C1.

A menu-down operation moves the highlight down to the submenu item. A menu-up operation moves the highlight back to the parent menu item. The menu-wheel operation scrolls the highlight in both directions in the active menu layer.

Whenever the users want to hide the context-dependent menu on the display, a menu-off/on operation toggle the control variable menu_Display from on to off and hide the menu display.

When the context-dependent menu is hided, any menu operation causes context-dependent menu displaying on the monitor.

With three control-wheel operations and six command-click operations, every menu item in the context-dependent menu structure could have up to three wheel-control functions, up to six click-commands as well as a plurality of submenu items. All the wheel-control functions are driven by the individual control-wheel operation and all the click-commands are triggered by the individual command-click operation. Switching between those wheel-control functions and click-commands does not require any menu selection. General top menu format of the context-dependent menu structure is shown in FIG. 5A where two-layer cascading menu format is used and the active menu layer with a highlighted menu item is displayed on the top. The content of the highlighted menu item is displayed under the active menu layer. In FIG. 5A, the active menu layer contains 8 menu items ("Menu1", "Menu2", . . . "Menu8"). The highlight is in the first menu item 51 ("Menu1") by default. The content of the highlighted menu item 51 ("Menu1") includes six click-commands ("K1", "K2", "K3", "K4", "K5" and "K6"), three wheel-control operations ("Ctrl Func1", "Ctrl Func2" and "Ctrl Func3") and three submenu items ("Menu11", "Menu12" and "Menu13"). The click-command with index k is triggered by the command-click operation with index of k. The wheel-control function with index k is driven by the control-wheel operation with index of k.

Whenever the users want to hide the context-dependent menu on the display, a menu-off/on operation toggle the control variable menu_Display from on to off and hide the menu display.

When the context-dependent menu is hided, any menu operation causes context-dependent menu displaying on the monitor.

Figure 2A:
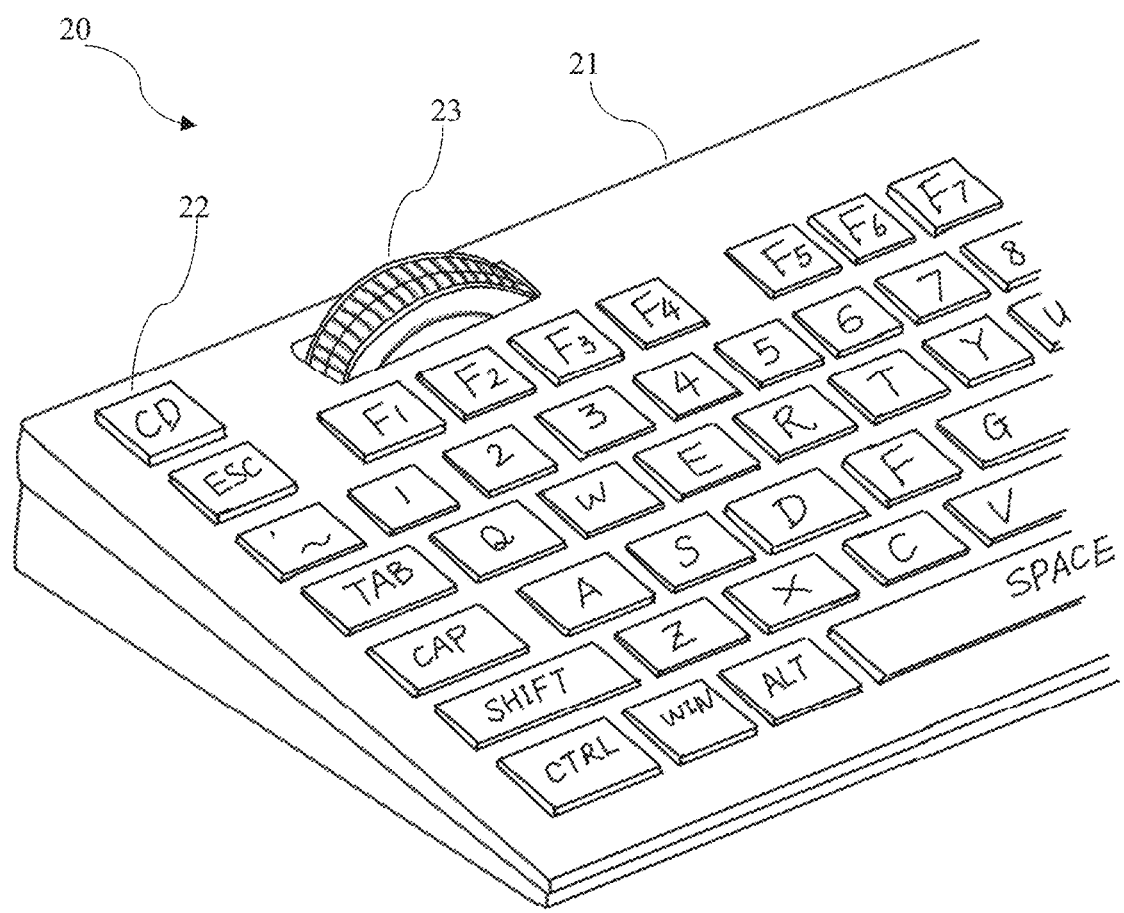
FIG. 2A is a perspective view of a computer keyboard with one scroll wheel and a mode button (CD) in the top area.

FIG. 2A shows a computer keyboard 20 includes a scroll wheel 23 and a mode button 21 said CD in the top area of the computer keyboard. Based on the method of the present invention, whenever detected the operation of long press the mode button CD, the computer keyboard device application program toggles the keyboard mode between the original mode and the context-dependent mode. The default mode is the original mode. When the keyboard is in the original mode, scrolling the wheel is preconfigured as scrolling the display vertically. To take the advantage of the connection of the context-dependent wheel and the keyboard, when mode is switched to the context-dependent mode, some key functions are redefined and are used for the context-dependent menu interface manipulation. The operation assignment for the context-dependent menu interface is shown in Table 3 shown in FIG. 7.

Long press mode button CD is specified as toggling the keyboard mode between the original mode and the context-dependent mode. It also functions as the menu-on/off operation which toggles the control variable menu_Display between on and off: when the keyboard works in the original mode, menu_Display is set to off; when the keyboard works in the context-dependent mode, menu_Display is set to on. When the keyboard works in the context-dependent mode, the computer keyboard device application program displays the context-dependent menu. When the keyboard works in the original mode, the context-dependent menu is hided.

In Table 3, five menu operations are specified from the operations involving the mode button and the letter key (Q, W, E, R):

The menu-down operation is specified as clicking key W.
The menu-up operation is specified as clicking key Q.
The menu-left operation is specified as clicking key E.
The menu-right operation is specified as clicking key R.
The menu-wheel operation is specified as rotating the wheel after clicking mode button CD.

In Table 3, 12 control-wheel operations are specified wherein the control-wheel operation with index n is specified as rotating the wheel after clicking the functional key Fn. 10 command-click operations is specified wherein the command-click operation with index k is specified as clicking the digital key k on the keyboard in the context-dependent mode. So, every menu item could have up to 12 wheel-control functions, up to 10 click-commands and a plurality of submenu items.

After clicking the mode button CD (setting the wheel as menu wheel), scrolling wheel moves the highlight in both direction in the active menu layer. If the highlighted menu item includes the submenu structure, a menu-down operation (clicking key W) moves the highlight to the first submenu item. When the highlight is in a submenu, the menu-up operation (clicking key Q) move the highlight back to the parent menu item. If the highlight is in the top menu, the menu-up operation moves the highlight to the first item of the top menu. A menu-right operation (clicking key R) moves the highlight to the adjacent menu item on the right in the active menu layer. If the current highlighted item is the last item in a menu layer, then the highlight is moved to the first menu item in a loop. A menu-left operation (clicking key E) moves the highlight to the adjacent menu item on the left in the active menu layer. If the current highlighted item is the first item in a menu layer, then the highlight is moved to the last menu item in a loop.

After selecting the menu item which is highlighted, the control-wheel operation with index n 90 changes the value of the n-th wheel-control function listed for the highlighted menu item. The command-click operation with index k triggers the k-th click-command listed for the highlighted menu item. For example, in the displayed menu shown in FIG. 8A, the active menu layer includes 6 menu items. The highlighted menu item "Menu2" contains 10 wheel-control functions, 10 click-commands as well as 2 submenu items. The first control-wheel operation changes the value of the first wheel-control function "Ctrl F1". The fifth control-wheel operation changes the value of the fifth wheel-control function "Ctrl F5". The fourth command-click operation triggers the fourth click-command "Cmd 4".

A menu-right operation can move the highlight to the menu item "Menu3". A menu-left operation can move the highlight to the menu item "Menu1". A menu-down operation can move the highlight to the submenu item "Menu21". When the highlight is moved to the submenu layer, the context-dependent menu is updated. An example is shown in FIG. 8B. When context-dependent menu is displayed like FIG. 8B, a menu-up operation can move the highlight from the menu item "Menu21" back to the parent menu item "Menu2".

Whenever the users want to hide the context-dependent menu on the display, a mode switch operation (menu-off/on operation) hides the menu display and switch the mode to the original mode.

When the context-dependent menu is hided, a mode switch operation (long press the mode button) causes context-dependent menu displaying on the monitor and set the mode to the context-dependent mode.

Figure 2B:
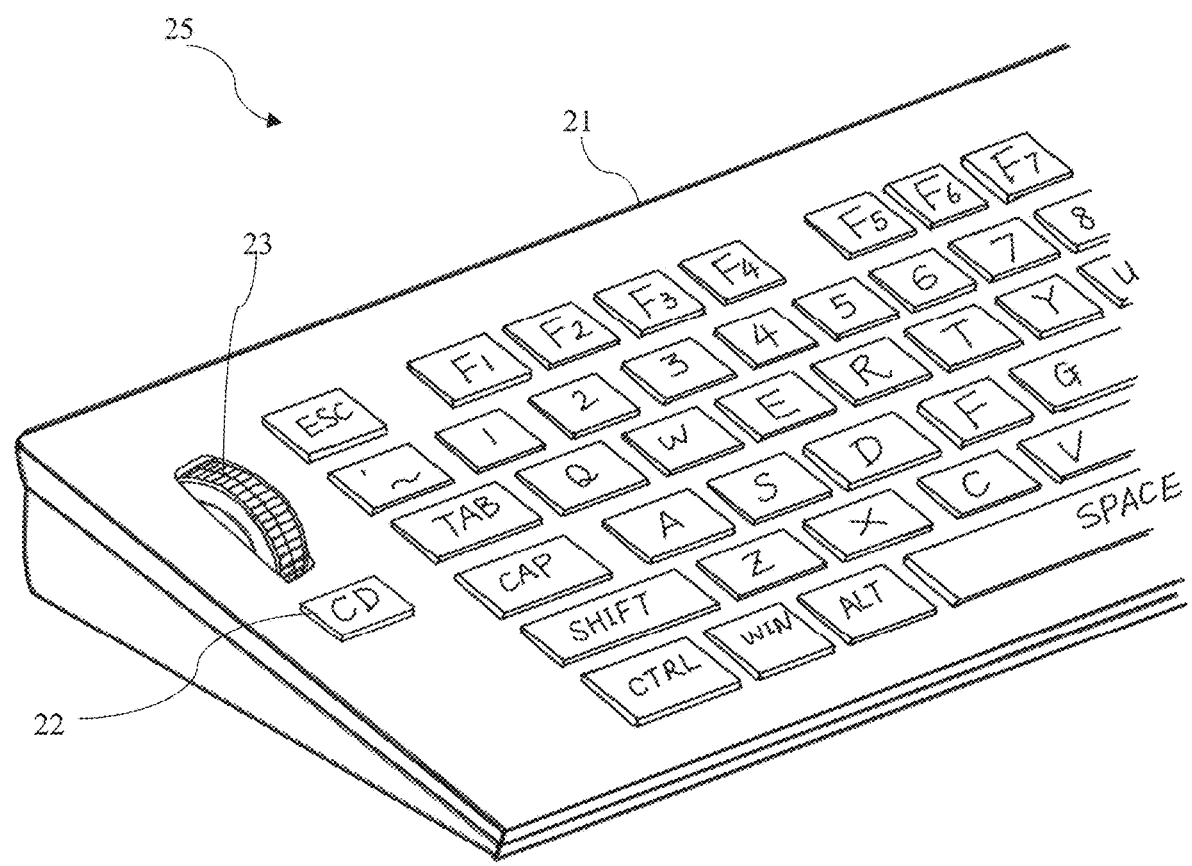
FIG. 2B is a perspective view of a computer keyboard with one scroll wheel and a mode button (CD) in the left area.

FIG. 2B shows a computer keyboard 25 includes a scroll wheel 23 and a mode button said CD 22 in the left area of the computer keyboard. The context-dependent menu interface operation assignment and the menu formation could be totally same as those for the keyboard 20 shown in FIG. 2A. The scrolling direction on the wheel is only different from that in FIG. 2A. The context-dependent menu format could be either horizontal or vertical.

Figure 2C:
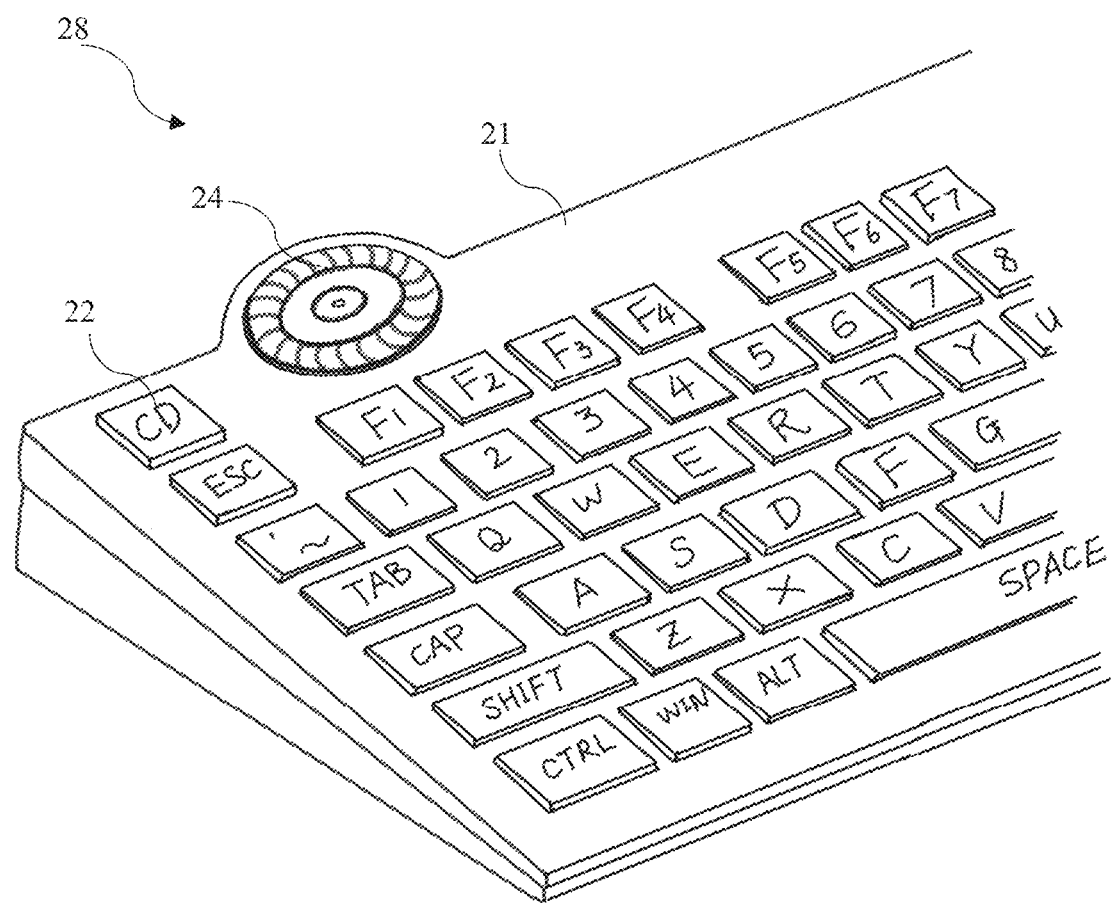
FIG. 2C is a perspective view of a computer keyboard with one dial and a mode button (CD) in the top area.

FIG. 2C shows a computer keyboard 28 includes a control dial 24 and a mode button said CD 22 in the top area of the computer keyboard. The function of the control dial is totally same as the scroll wheel. The only difference between the two is the way they operate. The context-dependent menu interface operation assignment and the context-dependent menu formation could be totally same as those for the keyboard 20 shown in FIG. 2A. The context-dependent menu format could be either horizontal or vertical.

FIG. 3 is Table 1 for an embodiment of the operation assignment for a computer mouse with one menu-button and three control-buttons on the thumb side wall of the mouse. The menu-button and control-buttons on the mouse are used to manipulate the context-dependent menu interface.

All the operations related to the context-dependent menu interface manipulation are either the joint operations involving the menu-button and control-buttons or just clicking the menu-button and control-buttons. They can be easily distinguished from the ordinary mouse scrolling and button clicking functions.

In Table 1 shown in FIG. 3, three menu-click operations and one menu-wheel operation are specified involving the menu-button m:

The menu on-off operation is specified as clicking the menu-button m which is used to toggle the value of control variable menu_Display between on and off.

The menu-down operation is specified as clicking the left button of the mouse while clicking and holding the menu-button m which is used to move the highlight down to the first submenu item. If the highlighted menu item does not have the submenu structure, the menu-down operation is ignored.

The menu-up operation is specified as clicking the right button of the mouse while clicking and holding the menu-button in which is used to move the highlight back to the parent menu item in the upper menu layer. If the highlight is already in top menu layer, the menu-up operation moves the highlight to the first menu item in the top menu layer.

The menu-wheel operation is specified as scrolling wheel while clicking and holding the menu-button m which is used to move the highlight in the active menu layer. It can move the highlight in both directions.

In Table 1, three control-wheel operations are specified as rotating the wheel while clicking and holding a control-button. For example, the first control-wheel operation is specified as rotating the wheel while clicking and holding the control-button C1 which is used to change the value of the first wheel-control function listed for the highlighted menu item.

six command-click operations are specified as clicking the left or right button while clicking and holding one of control-buttons. For example, the first command-click operation is specified as clicking the left button the mouse while clicking and holding the control-button C1 to trigger the first click-commands listed for the highlighted menu item, the second command-click operation is specified as clicking the right button the mouse while clicking and holding the control-button C1 to trigger the second click-commands listed for the highlighted menu item.

With above operation assignment, every menu item in the context-dependent menu structure could have up to three wheel-control functions, up to six click-commands and a plurality of submenu items. Every wheel-control function is driven by its respective control-wheel operation and every click-command is triggered by its respective command-click operation. Switching between those wheel-control functions and click-commands does not require any menu selection operation.

Besides the context-dependent menu interface operations, three static commands are specified as just clicking the control-buttons. The static commands work all the time.

Clicking the control-button C1 is specified as triggering the "Backward Page" commands.

Clicking the control-button C2 is specified as triggering the "Forward Page" commands.

Clicking the control-button C3 is specified as triggering the "Undo" commands.

The context-dependent menu structure shown in FIGS. 5A and 5B can be used for the computer mouse with the operation assignment table shown in FIG. 3.

FIGS. 5A and 5B are the general context-dependent menu format which has two-layer menu structure. The active menu layer with one highlighted menu item is displayed on the top. The content of the highlighted menu item is displayed under the top menu layer.

FIG. 4 shows one method for expanding the number of control-wheel operations and command-click operations.

For the computer mouse with one menu-button m and three control-buttons (C1, C2 and C3), three control-wheel operations and six command-click operations are specified in Table 1 shown in FIG. 3. Based on the methods presented in this invention, a new control-wheel operation could be specified as scrolling wheel on the computer mouse while double clicking and holding a control button a pair of new command-click operations could be specified as clicking left/right button on the computer mouse while double clicking and holding a control button. So, three new control-wheel operations and six new command-click operations could be specified for the mouse with three control-buttons (C1, C2 and C3):

The $4^{th}$ control-wheel operation is specified as scrolling the wheel on the computer mouse while double clicking and holding the control button C1.

The $5^{th}$ control-wheel operation is specified as scrolling the wheel on the computer mouse while double clicking and holding the control button C2.

The $6^{th}$ control-wheel operation is specified as scrolling the wheel on the computer mouse while double clicking and holding the control button C3.

Similarly, the $7^{th}$ and $8^{th}$ command-click operations are specified as clicking the left button and right button respectively while double clicking and holding the control-button C1.

The $9^{th}$ and $10^{th}$ command-click operations are specified as clicking the left button and right button respectively while double clicking and holding the control-button C2.

The $11^{th}$ and $12^{th}$ command-click operations are specified as clicking the left button and right button respectively while double clicking and holding the control-button C3.

With expanded control-wheel operations and command-click operations shown in Table 1 and Table 2, every menu item in the context-dependent menu structure could have up to 6 wheel-control functions, up to 12 click-commands and a plurality of submenu items.

Another method to expand the number of control-wheel operation and the command-click operations can be obtained by increasing the control-buttons. For example, when mouse includes four control-buttons (C1, C2, C3 and C4), each menu item in the context-dependent menu structure can have up to 4 wheel-control functions and up to eight click-commands.

FIG. 5A is the menu format diagram 50 of a context-dependent menu interface which can be used for the computer mouse shown in FIG. 1. The context-dependent menu interface is manipulated by the operations specified in Table 1 shown in FIG. 3.

The context-dependent menu interface displays two-layer menu format wherein the first layer is the active menu layer and the second layer is the contents of the highlighted menu item in the active menu layer.

In diagram 50, the active menu layer contains 8 menu items ("Menu1", "Menu2", . . . "Menu8"). The default highlight is in the first menu item 51 ("Menu1"). The content of the highlighted menu item 51 ("Menu1") includes six click-commands ("K1", "K2", "K3", "K4", "K5" and "K6"), three wheel-control operations ("Ctrl Func1", "Ctrl Func2" and "Ctrl Func3") and three submenu items ("Menu11", "Menu12" and "Menu13"). The click-command with index k is triggered by the command-click operation with index of k. The wheel-control function with index k is driven by the control-wheel operation with index of k. The click-commands and wheel-control functions are divided into three groups according to the index of the control-button that operations involved. For example, the operations "K1", "K2" and "Ctrl Func1" are related to the control-button C1 and are included in the group 1.

For the highlighted menu item, the value of the wheel-control functions with index k is changed by the k-th control-wheel operation. The k-th click-command is triggered by the k-th command-click operation. For example, the second control-wheel operation (rotating wheel while clicking and holding the control-button C2) changes the value of the second wheel-control function "Ctrl Fun2". The fifth command-click operation (click the left button of the mouse while clicking and holding the control-button C3) triggers the fifth click-command "K5".

The menu-down operation moves the highlight down to the first submenu item of the highlighted menu item. For example, when the menu item 51 ("Menu1") is highlighted, a menu-down operation moves the highlight down to the first submenu item "Menu11".

The menu-up operation moves the highlight back to the parent menu item in the upper menu layer. For example, when the highlight is moved to the menu item "Menu11", a menu-up operation moves the highlight back to its parent menu item 51 ("Menu1").

The menu-wheel operation scrolls the highlight in the active menu layer. It can move the highlight in both directions. For example, when the menu item 51 ("Menu1") is highlighted, the menu-drag operation (scrolling wheel while clicking and holding the menu-button n) moves the highlight to the right menu items such as to "Menu2", "Menu8".

When the context-dependent menu is displayed on the screen, a menu-on/off operation (click the menu-button) sets the control variable menu_Display to off and hides the context-dependent menu.

When the context-dependent menu has been hided, any menu-click operation sets menu_Display to on and displays context-dependent menu on the screen.

FIG. 5B is the submenu format diagram 55 of the menu item "Menu Item 13" shown in FIG. 5A.

When the top menu item 51 ("Menu1") is highlighted, a menu-down operation moves the highlight to the first submenu item "Menu11". Then the menu-wheel operation moves the highlight from menu item "Menu11" to the menu item "Menu13". After menu item 57 ("Menu13") is highlighted, its content is updated and displayed at the second menu layer in diagram 55.

In diagram 55, there are three menu items in the active menu layer ("Menu11", "Menu12" and "Menu13"). The menu item 57 ("Menu13") is highlighted. The menu item 57 ("Menu13") includes six click-commands and three wheel-control functions. It does not include any submenu items. The 6 click-commands ("K1", "K2", "K3", "K4", "K5" and "K6") and 3 wheel-control functions ("Ctrl Fun1", "Ctrl Fun2" and "Ctrl Fun3") are divided into 3 groups and can be triggered or driven instantly by the specified command-click operation or the control-wheel operation.

After finishing adjusting for the menu item 57 ("Menu13"), the menu-wheel operation moves the highlight to other menu items in the active menu layer. Or a menu-up operation moves the highlight back to the parent menu item 51 ("Menu1") shown in diagram 50.

FIGS. 6A-6E show five diagrams for an example of the context-dependent menu interface for a photo editing application. The context-dependent menu interface is manipulated by the computer mouse 10 shown in FIG. 1 and uses the context-dependent menu operation assignment shown in FIG. 3.

Figure 6A:
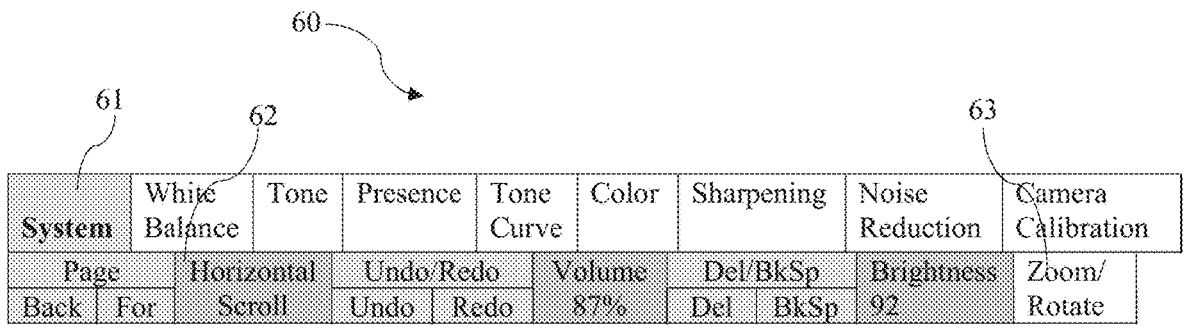
FIG. 6A is an example of the context-dependent menu user interface for a photo editing software.

FIG. 6A is the top menu structure diagram 60 of the top menu layer. The context-dependent menu interface can be used for the computer mouse with one menu-button and three control-buttons on the thumb side wall like that shown in FIG. 1. The menu interface operation assignment is shown in Table 1 in FIG. 3.

In diagram 60, the active menu layer includes 9 menu items. The first menu item 61 ("System") is highlighted by default.

With the menu-wheel operation, the highlight can be moved to any menu item in the active menu layer. The menu item 61 ("System") includes six click-commands, three wheel-control functions and a submenu structure, they are displayed at the second menu layer, six click-commands ("Backward Page", "Forward Page", "Undo", "Redo", "Delete" and "BackSpace") and three wheel-control functions ("Horizontal Scroll", "Volume" and "Brightness") are divided into three groups. The first group includes "Backward Page", "Forward Page" and "Horizontal Scroll". The second group includes "Undo", "Redo" and "Volume". The third group includes "Delete", "BackSpace" and "Brightness". The submenu structure includes only one menu item 63 ("Zoom/Rotate"). Six click-commands and three wheel-control functions can be used instantly and repeatedly. For example, the first control-wheel operation scroll the display in horizontal direction; the second control-wheel operation changes the system volume up and down; the third control-wheel operation changes the display brightness; the first command-click operation triggers "Backward Page" command; the second command-click operation triggers "Forward Page" command; the third command-click operation triggers "Undo" command; the fourth command-click operation triggers "Redo" command; the fifth command-click operation triggers "Delete" command; the sixth command-click operation triggers "BackSpace" command.

A menu-down operation moves the highlight down to the submenu item 63 ("Zoom/Rotate").

When the context-dependent menu is displayed on the screen, a menu-on/off operation sets the control variable menu_Display to off and hides the context-dependent menu.

When the context-dependent menu has been hided, any menu-click operation on the mouse sets menu_Display to on and displays context-dependent menu on the screen.

Figure 6B:
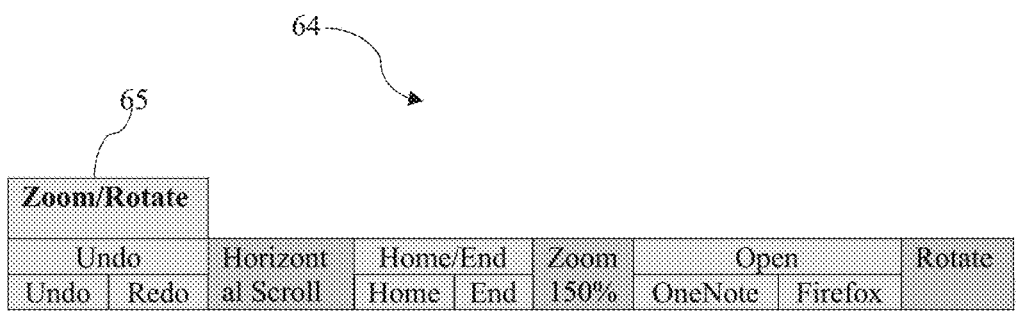
FIG. 6B is the bottom menu structure for the menu item "Zoom/Rotate".

FIG. 6B shows the menu format diagram 64 for the bottom menu item 65 ("Zoom/Rotate"). When the top menu item 61 ("System") is highlighted, a menu-down operation moves the highlight to the first submenu item "Zoom/Rotate". After menu item "Zoom/Rotate" being highlighted, its content is updated and displayed at the second menu layer shown in the diagram 64.

In diagram 64, the active menu layer has only one menu item 65 ("Zoom/Rotate"). The highlighted menu item "Zoom/Rotate" includes six click-commands and three wheel-control functions. They are displayed on the second menu layer. Six click-commands ("Undo", "Redo", "Home", "End", "Open OneNote" and "Open Firefox") and three wheel-control functions ("Horizontal Scroll", "Zoom" and "Rotate") can be instantly triggered or driven by the corresponding command-click operations or corresponding control-wheel operations.

After finishing adjusting for the menu item 65 ("Zoom/Rotate"), a menu-up operation moves the highlight back to the parent menu item 61 ("System") shown in diagram 60.

Figure 6C:
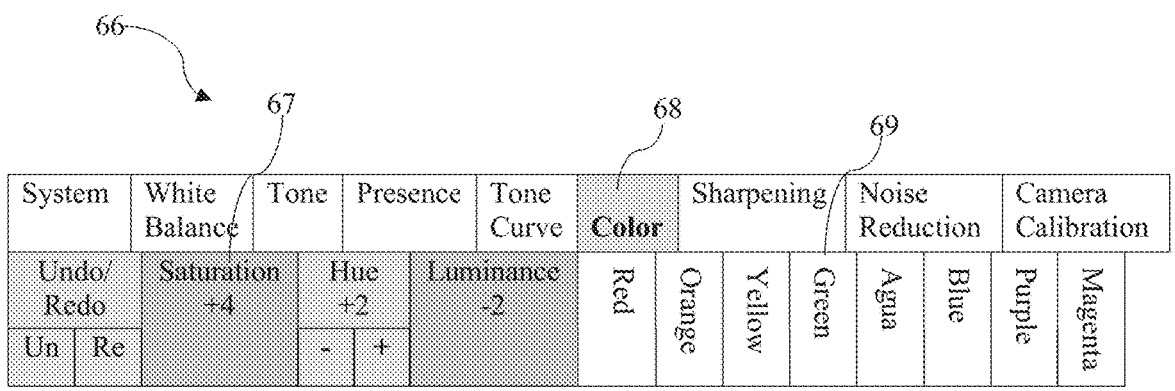
FIG. 6C is the top menu when the highlight is in the menu item "Color".

FIG. 6C shows the top menu structure diagram 66 when the highlight is moved from the menu item 61 ("System") shown in diagram 60 to the menu item "Color" in the top menu layer.

The top menu item "Color" includes four click-commands, two wheel-control functions and a submenu structure which has 8 menu items. When the top menu item "Color" is highlighted, its content is updated and displayed under the active menu layer shown in diagram 66.

Four click-commands ("Undo", "Redo", "Hue−" and "Hue+") and two wheel-control functions ("Saturation" and "Luminance") are used for adjusting for all colors and can be triggered or driven instantly by four command-click operations and two control-wheel operations, for example, the first command-click operation triggers "Undo" function. The second command-click operation triggers "Redo" function. The first control-wheel operation changes "Saturation" of all colors. The second control-wheel operation changes "Luminance" of all colors.

The diagram 66 shows that "Hue" for all colors has been changed to "+2" by the third command-click operation; "Saturation" has been changed to "+4" by the first control-wheel operation; "Luminance" has been changed to "−2" by the second control-wheel operation.

During adjusting for all colors with command-click operations and control-wheel operations, the menu-wheel operation moves the highlight to other menu items in the top menu layer.

During adjusting for all colors, a menu-down operation moves the highlight to the first submenu item "Red".

Figure 6D:
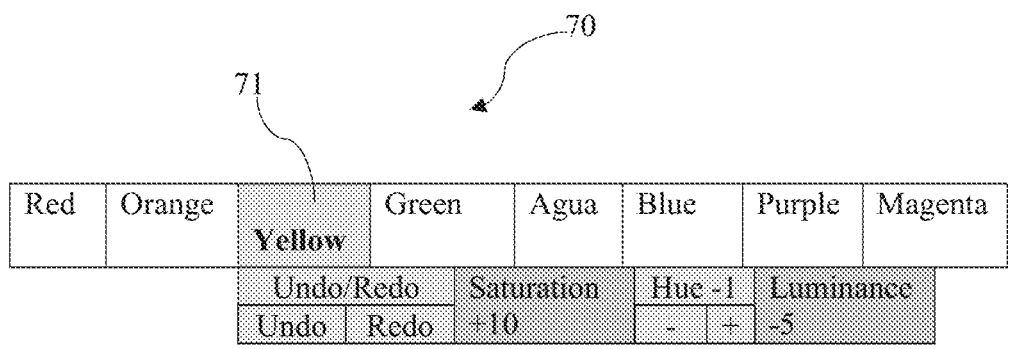
FIG. 6D is the submenu structure of the top menu item "Color" when the highlight is in the menu item "Yellow".

FIG. 6D shows a bottom menu structure diagram 70 for the color "Yellow". With a menu-down operation, the highlight is moved from the menu item 68 ("Color") to the first submenu item "Red". Then the menu-wheel operation moves the highlight to the menu item 71 ("Yellow") in the active menu layer. The menu item 71 ("Yellow") includes four click-commands and two wheel-control functions. It does not include any submenu structure. Four click-commands ("Undo", "Redo", "Hue−" and "Hue+") and two wheel-control functions ("Saturation" and "Luminance") are used for adjusting for color "Yellow" and can be triggered or driven instantly by four command-click operations and two control-wheel operations in the same way as above that for the all colors.

The diagram 70 shows the result after changing: "Hue" of "Yellow" has been changed to "−1"; "Saturation" of "Yellow" has been changed to "+10"; "Luminance" of "Yellow" has been changed to "−5".

After finishing adjusting for the color "Yellow", the menu-wheel operation moves the highlight to other colors in the active menu layer for adjusting.

A menu-up operation moves the highlight back to the parent menu item 68 ("Color") shown in diagram 66.

Figure 6E:
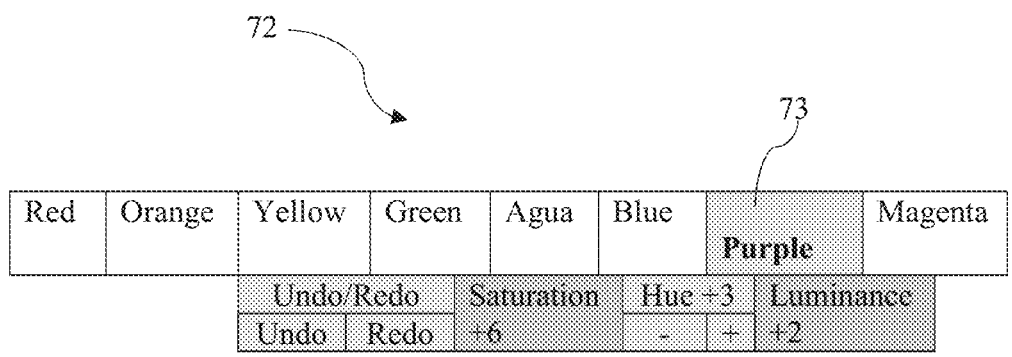
FIG. 6E is the submenu structure of the top menu item "Color" when the highlight is in the menu item "Purple".

FIG. 6E shows the bottom menu layer structure diagram 72 for the menu item "Purple". With the menu-wheel operations, the highlight is moved from the color 71 ("Yellow") shown in diagram 70 to the menu item 73 ("Purple") in the diagram 72. Adjusting is same as that for the color "Yellow".

The menu item 73 ("Purple") includes four click-commands and two wheel-control functions. They are displayed under the active menu layer. Four click-commands ("Undo", "Redo", "Hue−" and "Hue+") and two wheel-control functions ("Saturation" and "Luminance") are used for adjusting for the color "Purple" and can be triggered or driven instantly by four command-click operations and two control-wheel operations in the same way as that for color "Yellow".

The diagram 72 shows the result after changing: "Hue" of "Purple" has been changed to +3; "Saturation" of "Purple" has been changed to "+6"; "Luminance" of "Purple" has been changed to "+2".

After finishing adjusting for the color "Purple", the menu-wheel operation moves the highlight to other colors in the active menu layer for adjusting.

A menu-up operation moves the highlight back to the parent menu item 68 ("Color") shown in diagram 66.

FIG. 7 shows Table 3 for an embodiment of the operation assignment for keyboard working in the context-dependent mode. The computer keyboard includes a scroll wheel or a dial and a mode button CD shown in FIGS. 2A-2C.

A mode switch operation is specified as long pressing the mode button CD. It is used to toggle the keyboard mode between the original mode and the context-dependent mode.

The default mode is the original mode. When the keyboard is in the original mode, scrolling the wheel is preconfigured as the operation of vertical scrolling the display. When the keyboard is working in the context-dependent mode, the context-dependent menu interface is displayed and all the specified context-dependent related operations are active.

Besides the mode button CD, the functions for 12 functional keys, 10 digital keys and 4 letter keys (Q, W, E, R) are redefined for the context-dependent wheel and button function when keyboard is in the context-dependent mode.

The mode switch operation also triggers the menu-on/off operation which toggles the value of the control variable menu_Display between on and off. It displays the context-dependent menu when menu_Display=on and hide the menu when the variable menu_Display change from on to off.

Clicking the mode button CD sets the wheel as the menu-wheel.

After clicking the mode button CD, rotating wheel is specified as the menu-wheel operation.

Clicking key W is specified as the menu-down operation.
Clicking key Q is specified as the menu-up operation.
Clicking key E is specified as the menu-left operation.
Clicking key R is specified as the menu-right operation.
Clicking functional key Fn sets the wheel as the n-th control-wheel.

Rotating wheel after clicking functional key Fn is specified as the control-wheel operation with index n. Maximum 12 control-wheels can be specified.

Clicking the digital key i is specified as the command-click operation with index i. Maximum 10 command-click buttons can be specified.

Based on the above operation assignments, the highlight in the menu structure can be easily moved. Every menu item in the context-dependent menu structure could have up to 12 wheel-control functions, up to 10 click-commands and a plurality of submenu items.

The general menu format of the context-dependent menu structure suited for above operation assignment is shown in FIG. 8A and FIG. 8B. With so many click-commands and wheel-control functions for a single menu item, many related menu items can be merged together. This can help users simplifying their finger operations and doing more work for a single menu selection.

FIG. 8A is the menu format diagram 80 for an embodiment of a context-dependent menu interface. It is used for the computer keyboard with a scroll wheel or a dial and a mode button CD shown in FIGS. 2A-2C. The operations for the context-dependent menu interface are specified in Table 3 shown in FIG. 7.

The context-dependent menu interface displays two-layer menu format wherein the first layer is the active menu layer and the second layer is the contents of the highlighted menu item in the active menu layer wherein the second layer can be displayed in two sublayers: the wheel-control function sublayer and click-command sublayer. The submenu items are list at the right side of the wheel-control functions list.

In diagram 80, the active menu layer contains 6 menu items ("Menu1", "Menu2", . . . "Menu6"). The default highlight is in the first menu item "Menu1" by default. When the highlight is moved to the menu item 81 ("Menu2") shown in the diagram 80, the content of the highlighted menu item 81 ("Menu2") is displayed under the active menu layer. The highlighted menu item 81 includes ten wheel-control operations ("Ctrl F1", "Ctrl F2", . . . "Ctrl F10"), 10 click-commands ("Cmd1", "Cmd2", . . . "Cmd10") and two submenu items ("Menu21" and "Menu22"). In the context-dependent mode, the wheel-control function with index n is driven by rotating wheel after clicking the functional key Fn (the control-wheel operation with index of n). The click-command with index i is triggered by clicking the digital key i (the command-click operation with index of i). The click-command list is displayed under the wheel-control function list. This arrangement coincides with the layout of the functional keys and digital keys on the keyboard. For example, in the context-dependent mode, rotating wheel after clicking F2 changes the value of the wheel-control function "Ctrl F2". Clicking digital key 5 triggers the fifth click-command "Cmd5".

The menu-down operation moves the highlight down to the first submenu item of the highlighted menu item. For example, when the menu item 81 ("Menu2") is highlighted, a menu-down operation moves the highlight down to the first submenu item "Menu21".

The menu-up operation moves the highlight back to the parent menu item in the upper menu layer. For example, when the highlight is moved to the menu item "Menu21", a menu-up operation moves the highlight back to its parent menu item 81 ("Menu2").

The menu-wheel operation scrolls the highlight in the active menu layer. It can move the highlight in both directions. For example, when the menu item 81 ("Menu2") is highlighted, the menu-drag operation (scrolling wheel while clicking and holding the menu-button m) moves the highlight to the menu item "Menu1" on the left or to the menu items on the right such as to "Menu3", . . . "Menu6".

When the context-dependent menu is displayed on the screen, a mode switch operation (long press on the mode button CD) sets the control variable menu_Display to off and hides the context-dependent menu.

When the keyboard works in the original mode, the context-dependent menu is hided. A mode switch operation sets the keyboard to the context-dependent mode. It also sets menu_Display to on and displays the context-dependent menu on the screen.

FIG. 8B is the submenu format diagram 85 of the menu item "Menu Item 21".

When the top menu item 81 ("Menu" is highlighted, a menu-down operation moves the highlight to the first submenu item 86 ("Menu21"). After menu item 86 ("Menu21") is highlighted, its content is updated and displayed under the active menu layer shown diagram 85.

In diagram 85, the active menu layer has two menu items ("Menu21", "Menu22"). The menu item 86 includes 12 wheel-control functions and 10 click-commands. It does not include any submenu items. 12 wheel-control functions ("Ctrl F1", "Ctrl F2", . . . "Ctrl F12") and 10 click-commands ("Cmd1", "Cmd2", . . . "Cmd0") cab be driven or triggered instantly by the specified control-wheel operations or command-click operations. For example, in the context-dependent mode, rotating wheel after clicking F8 changes the value of the $8^{th}$ wheel-control function "Ctrl F8". Clicking digital key 5 triggers the $5^{th}$ click-command "Cmd5".

For a specific control-wheel operation, after clicking the function key Fn, the corresponding wheel-control function listed in the menu is highlighted with different background color to indicate the active wheel-control function. It keeps active until different functional key is clicked or the mode button CD is clicked (menu-wheel-set operation) during the context-dependent mode. When the wheel is set as menu-wheel, all the wheel-control functions in the menu have the same background color. This condition indicates the menu-wheel is active. For example, after clicking the functional key F6, the wheel-control function "Ctrl F6" is highlighted with a dark background color. It indicates the 6$^{th}$ control-wheel is active.

After finishing adjusting for the menu item 86 ("Menu21"), the menu-right operation moves the highlight to the menu item "Menu22" in the active menu layer. Or a menu-up operation moves the highlight back to the parent menu item 81 ("Menu2") shown in diagram 80.

FIGS. 9A-9C show the context-dependent menu interface diagrams for a photo editing application which uses the context-dependent mode operations shown in FIG. 7. The diagram 90 shown in FIG. 9A is the top menu format of a context-dependent menu interface for the keyboard included a scroll wheel and a mode button CD. The context-dependent menu interface operation assignment is listed in Table 3 shown in FIG. 7. In diagram 90, the first menu item 91 ("System") is highlighted by default and its contents are displayed under the active menu layer. With the menu-right operation, menu-left operation or menu-wheel operation, the highlight can be moved in both directions in the active menu layer. For example, with 3 menu-right operations, the highlight is moved to the menu item "White Balance/Color". With a menu-left operation, the highlight is moved from menu item "White Balance/Color" to the menu item "Tone Curve". With the menu-wheel operation, the highlight can be moved in both directions.

The menu item 91 ("System") includes six wheel-control functions and eight click-commands. They can be used instantly. For example, the first control-wheel operation scrolls the display in vertical direction; the third control-wheel operation zooms in/out the display; the fifth control-wheel operation changes the system volume up and down; the second command-click operation triggers "Forward Page" command; the fifth command-click operation triggers "Mute sound" command.

FIG. 9B shows the menu structure diagram 95 for the highlighted menu item "White Balance/Color" in the top menu layer. When the highlight is moved from the menu item 91 ("System") shown in diagram 90 to the menu item 97 ("White Balance/Color") by the menu-wheel operation, the contents of the menu item 97 ("White Balance/Color") is displayed under the active menu layer.

The menu item 97 ("White Balance/Color") includes 10 wheel-control functions, 10 click-commands and a submenu item. They are divided into 5 groups. Every group includes two wheel-control functions and two click-commands. The first group (F1, WB) includes "Temp", "Tint", "Undo" and "Redo". The second group (All color) includes "Saturation", "Luminance", "Hue+" and "Hue−". The third group (F5: Red) includes "Saturation", "Luminance", "Hue+" and "Hue−". The fourth group (F7: Orange) includes "Saturation", "Luminance", "Hue+" and "Hue−". The fifth group (F9: Yellow) includes "Saturation", "Luminance", "Hue+" and "Hue−".

The functions and commands related to the keys (F1, F2, 1, 2) belong to the first group which are used for adjusting the white balance: "Temperature" (F1), "Tint" (F2), and for general purpose: "Undo" (1) and "Redo" (2).

The functions and commands related to the keys (F3, F4, 3, 4) belong to the second group which are used for adjusting the all color: "Saturation" (F3), "Luminance" (F4), "Hue+" (3) and "Hue−" (4).

The functions and commands related to the keys (F5, F6, 5, 6) belong to the third group which are used for adjusting the color "Red": "Saturation" (F5) "Luminance" (F6), "Hue+" (5) and "Hue−" (6).

The functions and commands related to the keys (F7, F8, 7, 8) belong to the fourth group which are used for adjusting the color "Orange": "Saturation" (F7), "Luminance" (F8), "Hue+" (7) and "Hue−" (8).

The functions and commands related to the keys (F9, F10, 9, 0) belong to the fifth group which are used for adjusting the color "Yellow": "Saturation" (F9), "Luminance" (F10), "Hue+" (9) and "Hue−" (0).

During adjusting for the white balance as well as 4 colors, the menu-right operation or menu-left operation or menu-wheel operation move the highlight to other menu items in the top menu layer shown in the diagram 95.

During above adjusting, a menu-down operation moves the highlight from the menu item 97 ("White Balance/Color") to the submenu item "Gr/Ag/Bl/Pu/Ma".

FIG. 9C shows the menu structure diagram 100 for the menu item "Gr/Ag/Bl/Pu/Ma". With a menu-down operation, the highlight is moved from the menu item 97 ("Color") to its submenu item "Gr/Ag/Bl/Pu/Ma" shown in diagram 100. The menu item 101 ("Gr/Ag/Bl/Pu/Ma" includes 10 wheel-control functions and 10 click-commands. They are displayed under the active menu layer shown in diagram 100. Similar as the menu structure shown in diagram 95, they are divided into 5 groups. Every group includes two wheel-control functions and two click-commands. The first group (F1: Green) includes "Saturation", "Luminance", "Hue+" and "Hue−". The second group (F3: Agua) includes "Saturation", "Luminance", "Hue+" and "Hue−". The third group (F5: Blue) includes "Saturation", "Luminance", "Hue+" and "Hue−". The fourth group (F7: Orange) includes "Saturation", "Luminance", "Hue+" and "Hue−". The fifth group (F9: Magenta) includes "Saturation", "Luminance", "Hue+" and "Hue−".

For a specific control-wheel operation, after clicking the function key Fn, the corresponding wheel-control function listed in the menu is highlighted with different background color to indicate the active wheel-control function. It keeps active until different functional key is clicked or the mode button CD is clicked (menu-wheel-set operation) during the context-dependent mode. When the wheel is set as menu-wheel, all the wheel-control functions in the menu have the same background color. This condition indicates the menu-wheel is active.

The functions and commands related to the keys (F1, F2, 1, 2) belong to the first group which are used for adjusting the color "Green": "Saturation" (F1), "Luminance" (F2), "Hue+" (1) and "Hue−" (2).

The functions and commands related to the keys (F3, F4, 3, 4) belong to the second group which are used for adjusting color "Agua": "Saturation" (F3), "Luminance" (F4), "Hue+" (3) and "Hue−" (4).

The functions and commands related to the keys (F5, F6, 5, 6) belong to the third group which are used for adjusting the color "Blue": "Saturation" (F5), "Luminance" (F6), "Hue+" (5) and "Hue−" (6).

The functions and commands related to the keys (F7, F8, 7, 8) belong to the fourth group which are used for adjusting the color "Purple": "Saturation" (F7), "Luminance" (F8), "Hue+" (7) and "Hue−" (8).

The functions and commands related to the keys (F9, F10, 9, 0) belong to the fifth group which are used for adjusting the color "Magenta": "Saturation" (F9), "Luminance" (F10), "Hue+" (9) and "Hue−" (0).

After finishing adjusting for the color "Gr/Ag/Bl/Pu/Ma", a menu-up operation moves the highlight back to the parent menu item 97 ("White Balance/Color" shown in diagram 95.

FIG. 10 shows a pre-configured function and command list diagram 110 for a computer keyboard with a scroll wheel and a mode button CD.

When the context-dependent menu interface has only one menu item, all the menu operation except the mode-switch operation are not required. The wheel-control function and the click-command list are either context-dependent or pre-configured function list. Up to 12 control-wheel operations and up to 10 command-click operations can make the usage much easier and fast.

FIG. 10 is an example where a preconfigured wheel-control function and click-command list is used for supporting some most common system functions and commands. The system wheel-control functions and click-commands can be preconfigured by the computer keyboard application program.

The first level includes 8 wheel-control functions: "V Scroll", "H Scroll", "Zoom", "Rotate", "Volume", "Bright", "Contrast", "Sharpness". They can be expanded to support 12 wheel-control functions.

The second level shows 8 click-commands: "Backward Page", "Forward Page", "Undo", "Redo", "Mute Volume", "Stop Media Play", "Play/Pause Media Play", "Open Firefox app". They can be expanded to support 10 click-commands.

When keyboard is in the original mode, the menu is hided. All the functional keys and digital keys work in their original functions. Rotating wheel can be specified as a system wheel-control function such as vertically scrolling the display.

FIG. 11 shows the applications that the context-dependent wheels and buttons on the mouse and keyboard can support.

With the help of the context-dependent menu displayed on the screen, the context-dependent wheels and buttons on the computer mouse and keyboard work as a multi-functional control panel which has a plurality of command buttons and a plurality of control dials or control sliders on the panel.

Besides Microsoft Surface Dial device and Logitech Crown Dial on the Craft keyboard for the all-purpose editing tools, there are a lot of dedicated control panel devices which are used to support photo editing, video editing, color grading, audio editing software such as:
(1) Palette Professional Kit Customizable Controller for Photo & Video Editing with Adobe Lightroom, Adobe Photoshop, Adobe Premiere Pro
(2) Blackmagic Design Davinci Resolve Mini Panel
(3) Loupedeck Photo Editing Console for Adobe Lightroom
(4) Tangent Wave Panel for color grading.
(5) Tangent Element Bundle of Tk, Mf, Bt Panel for color grading.

All these dedicated input control tools are used for specific applications. When they are used, usually the keyboard and the pointing device such as mouse have to be used during the editing in these applications.

The context-dependent wheels and buttons on the computer mouse or keyboard work with the context-dependent menu user interface. It can support most of the office tools, photo, video, audio editing applications with their easy, quick and comfortable manipulation style. Comparing with the dedicated control panel device, the computer mouse and keyboard are more commonly used and cheaper. Switching between the original mode and the context-dependent mode is much easier than switching between dedicated input control tools and mouse or keyboard.

Because all the operations for the context-dependent wheels and buttons on the computer mouse are mainly thumb position related. When using the context-dependent wheels and buttons on the mouse, the users don't have to move their eyesight from the screen to the mouse. They can select the menu on the display by pressing and holding the menu-button and rotating the wheel to scroll the highlight in the active menu layer; clicking left button to move the highlight into submenu layer; clicking right button to move upward to parent menu item. After selecting the menu item, changing thumb position to press a specific control-button for specific wheel-control function or specific click-command. When the ordinary mouse functions of the mouse are needed, the only one thing needs to do is releasing the thumb finger.

The operations for the context-dependent wheels and buttons on the computer keyboard are also very easy and convenient for using.

The context-dependent wheels and buttons on the computer mouse and keyboard can support all the word processing and office applications such as Microsoft Word; Microsoft OneNote; Excel; PowerPoint and MS Visio.

The context-dependent wheels and buttons on the computer mouse and keyboard can support the video editing applications such as Adobe Premiere Pro; Apple Final Cut Pro X; Corel VideoStudio Ultimate; Sony Catalyst Production Suite.

The context-dependent wheels and buttons on the computer mouse and keyboard can support the audio editing applications such as Adobe Audition; Apple Logic Pro X.

The context-dependent wheels and buttons on the computer mouse and keyboard can support the CAD Design tool applications such as AutoCAD and TurboCAD.

The methods and systems described above can be used alone or in various combinations. The methods may be implemented singularly or by a combination of hardware, software, and/or firmware.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer system comprising:
a computer mouse including a scroll wheel, a menu button and a plurality of control buttons with incremental index;
a display device;
a computer mouse device application program executable on the computer processor configured to:
maintain the ordinary mouse scrolling and button clicking functions;
manage a multi-level context-dependent cascading menu interface wherein each menu item includes a plurality of wheel-control functions, a plurality of click-commands and some submenu items;
display two-layer menu on the display device wherein the active menu layer with one highlighted menu item is displayed on top and the content of the highlighted menu item is displayed in the second layer;
create a control variable menu_Display which has two possible values: {off=0, on=1};
display the context-dependent menu when menu_Display=on;

hide the context-dependent menu when menu_Display=off;

specify a menu-down operation and a menu-up operation as clicking the left/right button while clicking and holding the menu button respectively; move the highlight to the first submenu item when detected menu-down operation; move the highlight back to the parent menu item when detected menu-up operation;

specify a menu-on/off operation as clicking the menu button; toggle the menu_Display value whenever detected menu-on/off operation;

specify a menu-wheel operation as scrolling the wheel while clicking and holding menu button on the computer mouse; move the highlight in the active menu layer when detected the menu-wheel operation;

specify a plurality of control-wheel operations wherein each control-wheel operation is specified as scrolling the wheel while clicking and holding a control button on the computer mouse and the control-wheel operation has the same index as its respective control button; change the value of the n-th wheel-control function listed for the highlighted menu item when detected the control-wheel operation with index n;

specify a plurality of command-click operations wherein each command-click operation is specified as clicking the left button or right button while clicking and holding a control buttons on the mouse and the command-click operation has its incremental index; trigger the m-th click-command listed for the highlighted menu item when detected the command-click operation with index m;

set menu_Display to off when no-operation exceeds the specified time limit.

2. The computer system according to claim 1, wherein the active menu layer of context-dependent menu is display vertically on the display device, the highlighted menu item contents is displayed vertically on the right side of the highlighted menu item.

3. The computer system according to claim 1, wherein a control-wheel operation is specified as scrolling the wheel on the computer mouse while double clicking and holding a control button.

4. The computer system according to claim 1, wherein a command-click operation is specified as clicking the left button or the right button on the computer mouse while double clicking and holding a control button.

5. The computer system according to claim 1, wherein the context-dependent menu includes system tool control menu items wherein the wheel-control functions and the click-commands are configurable by the computer mouse device application program.

6. The computer system according to claim 1, wherein the menu interface includes only a plurality of system wheel-control functions and the click-commands, does not specify any menu operations except menu-on/off operation.

7. The computer system according to claim 1, wherein the wheel-control functions, the click-commands and the submenu items listed for the highlighted menu item are distinguished by different background colors and they are grouped according to the related control button index.

8. The computer system according to claim 1, wherein each wheel-control function and the click-command listed for the highlighted context-dependent menu item has its index number in its mark.

9. A computer system comprising:
a computer keyboard including a scroll wheel and a mode button;
a display device;
a computer keyboard device application program executable on the computer processor configured to:
switch the keyboard mode between the original mode and the context-dependent mode when detected long press the mode button;
manage a multi-level context-dependent cascading menu interface wherein each menu item includes a plurality of wheel-control functions, a plurality of click-commands and some submenu items;
display the context-dependent menu when keyboard is in the context-dependent mode;
hide the context-dependent menu when keyboard is in the original keyboard mode;
display two-layer menu on the display device wherein the active menu layer with one highlighted menu item is displayed on top and the content of the highlighted menu item is displayed under the active menu layer;
specify a menu-down operation, a menu-up operation, a menu-right operation and a menu-left operation from clicking keyboard letter keys in the context-dependent mode; move the highlight to the first submenu item when detected the menu-down operation; move the highlight back to the parent menu item when detected the menu-up operation; move the highlight to the adjacent menu item on the right in the active menu layer when detected the menu-right operation; move the highlight to the adjacent menu item on the left in the active menu layer when detected the menu-left operation;
specify a menu-wheel-set operation as clicking the mode button CD and used to set the wheel as the menu-wheel; specify a menu-wheel operation as rotating the wheel after clicking the mode button CD; move the highlight in the active menu layer when detected menu-wheel operation;
specify a plurality of control-wheel operations as rotating the wheel after clicking different functional key Fn on the keyboard in the context-dependent mode; change the value of the n-th wheel-control function listed for the highlighted menu item when detected the control-wheel operation with index n;
specify a plurality of command-click operations as clicking the digital keys on the keyboard in the context-dependent mode; trigger the m-th click-command listed for the highlighted menu item when detected the command-click operation with index m.

10. The computer system according to claim 9, wherein the context-dependent wheel is a context-dependent dial disposed on the top of the keyboard which has the same functions as the context-dependent wheel.

11. The computer system according to claim 9, wherein the active menu layer of context-dependent menu is display vertically on the display device, the contents of the highlighted menu item in the active menu layer is displayed vertically on the right side of the highlighted menu item.

12. The computer system according to claim 9, wherein rotating the wheel on the keyboard in the original mode is specified as a preconfigured system wheel-control function.

13. The computer system according to claim 9, wherein the active wheel-control function in the displayed menu has a specific background color after the respective control-wheel-set operation; all the wheel-control functions have the same background color after menu-wheel-set operation.

14. The computer system according to claim 9, wherein the context-dependent menu includes system tool control menu items wherein the wheel-control functions and the click-commands are pre-configurable by the computer keyboard device application program.

15. The computer system according to claim 9, wherein scrolling the wheel in the original mode is preconfigured as a system function and is configurable by the computer keyboard device application program.

16. The computer system according to claim 9, wherein the menu interface includes only a plurality of system wheel-control functions and the click-commands, and does not specify any menu operations except mode switch operation.

17. The computer system according to claim 9, wherein each wheel-control function and the click-command listed for the highlighted menu item has its index number in its mark.

* * * * *